United States Patent
Iyer et al.

(10) Patent No.: US 6,481,007 B1
(45) Date of Patent: Nov. 12, 2002

(54) OPTIMIZING PARAMETER PASSING

(75) Inventors: Chandrasekharan Iyer, Foster City, CA (US); Ajay Sethi, Belmont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/324,893

(22) Filed: Jun. 3, 1999

(51) Int. Cl.$^7$ .................................................. G06F 9/45
(52) U.S. Cl. ...................................................... 717/151
(58) Field of Search ................................. 717/9, 4, 157, 717/151, 124–135; 709/315; 712/217, 244

(56) References Cited

U.S. PATENT DOCUMENTS

| | | | |
|---|---|---|---|
| 4,860,204 A | * 8/1989 | Gendron et al. | 364/300 |
| 5,161,216 A | * 11/1992 | Reps et al. | 395/375 |
| 5,485,616 A | * 1/1996 | Burke et al. | 395/700 |
| 5,535,394 A | * 7/1996 | Burke et al. | 395/700 |
| 5,613,117 A | * 3/1997 | Davidson et al. | 395/708 |
| 5,671,419 A | * 9/1997 | Carini et al. | 395/709 |
| 5,761,513 A | * 6/1998 | Yellin et al. | 395/705 |
| 5,787,241 A | * 7/1998 | Henry et al. | 395/181 |
| 5,793,944 A | * 8/1998 | Luick | 395/182.13 |
| 5,963,739 A | * 10/1999 | Homeier | 395/704 |
| 6,038,661 A | * 3/2000 | Yoshioka et al. | 712/244 |
| 6,173,444 B1 | * 1/2001 | Archambault | 717/9 |
| 6,247,169 B1 | * 6/2001 | DeLong | 717/4 |
| 6,295,640 B1 | * 9/2001 | Eidt | 717/4 |

OTHER PUBLICATIONS

Chase et al. Analysis of Pointers and Structures. ACM. 1990. pp. 296–310.*
Choi et al. Efficient Flow–Sensitive Interprocedural Computation of Pointer–Induced Aliases and Side Effects. ACM. 1993. pp. 232–245.*
Landi et al. Interprocedural Modification Side Effect Analysis With Pointer Aliasing. ACM. 1993. pp. 56–67.*
Deutsch. Interprocedural May–Alias Analysis for Pointers: Beyond k–Limiting. ACM. 1994. pp. 230–241.*

\* cited by examiner

Primary Examiner—Kakali Chaki
Assistant Examiner—Wei Zhen
(74) Attorney, Agent, or Firm—Hickman Palermo Truong & Becker LLP; Carina M. Tan; Edward A. Becker

(57) ABSTRACT

A method and system for optimizing the passing of a parameter to a routine is provided. It is determined if any parameters are aliased in a call to a called routine. In the absence of aliases, calling routines passing parameters to called routines using "call by reference". Recovery mechanisms are provided, when appropriate, when unhandled exception occur during execution of the called routines. According to the method, a recovery mechanism includes encapsulating the called routine and call statement block with a "catch-all" exception handler. The response to an otherwise unhandled exception includes restoring the actual parameter using a stored copy of the actual parameter. The restoration is performed by making a handle point to the copy of the actual parameter that was made before execution of the called routine.

33 Claims, 6 Drawing Sheets

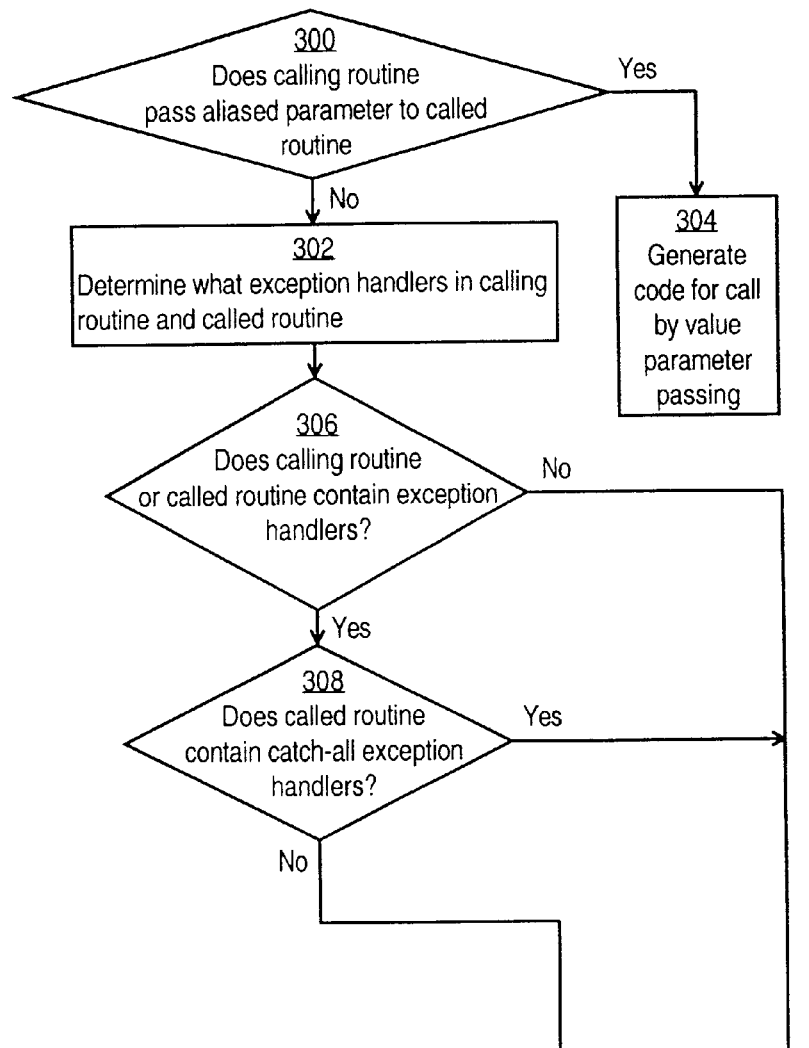

OPTIMIZING PARAMETER PASSING

FIELD OF THE INVENTION

This invention relates to the run-time efficiency of computer programs and, more specifically, to a method for optimizing parameter passing.

BACKGROUND OF THE INVENTION

An important consideration in many computer programs and programming languages is performance. Speed and correctness are examples of performance metrics, and are critical to the viability of computation intensive computer programs.

The quest for greater run-time speeds has often focussed on ways that information or data and data structures can be accessed and manipulated. Often, computer programs include routines that carry out well-defined operations on data specified by parameters. As used herein, the term "routine" refers to functions, procedures, methods and/or subroutines. To transfer control to a routine, a call is made to the routine. For the purposes of explanation, the portion of code that makes a call to a routine will be referred to as the "calling routine", while the portion of the code thus called is the "called routine". Typically, parameters are provided from the calling routine to the called routine as input for each call.

The act of passing parameter values to a called routine is known as "parameter passing". Two common methods of parameter passing are "call by value", and "call by reference". The following definitions aid in explaining parameter passing. A "formal parameter" is a parameter value stored in a storage location that is used by the called routine. An "actual parameter" is a parameter value stored in a storage location used by the calling routine. From the perspective of the calling routine, the "actual parameter" is passed to and/or received from the called routine. From the perspective of the called routine, the "formal parameter" is received from and/or passed to the calling routine.

In the case of "call by value", the actual parameter and the corresponding formal parameter are stored in separate storage locations. Specifically, the value of the actual parameter in the calling routine is copied to a separate storage allocated for holding the formal parameter in the called routine. Therefore, any changes made to the formal parameters of the routine modify only the copy of the actual parameter. Only upon successful completion of execution of the called routine, the modified value of the formal parameter is copied back to the actual parameter. Thus, when the called routine fails with an unanticipated error ("unhandled exception"), the modified value of the formal parameter is not copied back to the actual parameter. This ensures that the actual parameter remains uncorrupted by any exception occurring during execution of the called routine. Note that for anticipated errors (handled exceptions), it is assumed that the proper recovery mechanism is employed.

However, the disadvantage of "call by value" parameter passing is that it is inefficient. As explained above, in executing a call, two copy operations are performed for each parameter for "call by value". The first copy is performed when the value of the actual parameter is copied to a separate storage allocated for holding the formal parameter of the routine before execution of the routine (copy-in). The second copy is performed when the modified value of the formal parameter of the called routine is copied back to the actual parameter upon successful completion of execution of the called routine (copy-out). Thus, the copy-in and copy-out transactions incurred in "call by value" parameter passing are inefficient. This is of particular concern in database systems where applications manipulate large volumes of data and where a parameter can comprise a very large data structure, such as a large record, or large array.

In the case of "call by reference", the same storage location is used for both the actual and formal parameters. Specifically, the address of the actual parameter of the calling routine is passed to the called routine. Any changes made by the called routine to the formal parameter directly modify the actual parameter. There is no copy-in and copy-out of the parameters. Because no copies of the values of the parameters are required in "call by reference" parameter passing, it is more efficient than "call by value" parameter passing. However, there are at least two disadvantages to "call by reference" parameter passing.

One obvious disadvantage to "call by reference" parameter passing is that the routine directly modifies the actual parameter as explained above. Thus, when the called routine fails due to an unhandled exception, whatever undesirable modifications made by the called routine are made directly to the actual parameters.

Another disadvantage to "call by reference" parameter passing is in the context of aliases. Two parameters in a program are said to be aliased if they both point to the same memory location. This can cause unintended results. For example, consider a procedure that has two parameters. Suppose the same parameter is passed twice in the same call to the procedure using "call by reference" as illustrated in the following pseudocode, interspersed with explanatory comments denoted by the prefix, " - - - ":

```
main ( )
   n number;
begin
   n:=10;
   proc (n, n); - - - call to the routine proc end;
```

Assume that the routine proc is as follows:

```
proc (p1 number, p2 number) is
begin
   p1:=5;
   print (p2);
end;
```

The print statement in the above routine will produce the value 5 if p1 and p2 are passed using "call by reference". Both p1 and p2 point to the same memory location, i.e. the memory location of the actual parameter, n. The first assignment, p1:=5;

would modify the value of p2 as well. Clearly, this produces an unintended result.

Note that if the p1 and p2 were passed to routine proc using "call by value" parameter passing, the print statement would produce the value 10. Even though the same variable n was passed twice to the routine proc as actual parameters, two separate copies of the actual parameter, one bound to p1 and the other bound to p2, were made before execution of routine proc. Thus, the following assignment would only modify the copy of the actual parameter that is bound to p1.

p1:=5;

However, the copy of the actual parameter that is bound to p2 remained intact. Thus, the following print statement would produce the value 10.

print (p2);

To summarize, "call by value" parameter passing has the advantage of clean semantics in the context of exception handling and aliases. However, this advantage comes at the expense of performance. Whereas "call by reference" parameter passing has the advantage of good performance but may produce unintended results in the context of aliases. "Call by reference" parameter passing may also cause corruption of actual parameters due to unhandled exceptions.

Alias detection and prevention is a well-researched problem. A number of techniques have been suggested in the literature. An appropriate technique can be used in conjunction with this invention to determine the presence of aliasing among parameters as well as among global variables and subprogram parameters.

Based on the foregoing, there is a need for a method or mechanism to take advantage of better performance provided by "call by reference" parameter passing while obviating unintended results in the context of aliases and corruption of actual parameters due to unhandled exceptions.

SUMMARY OF THE INVENTION

The foregoing needs are addressed by the present invention, which comprises, in one aspect, a method and system for optimizing the passing of a parameter to a routine. It is determined if any parameters are aliased in a call to a called routine. In the absence of aliases, calling routines pass parameters to called routines using "call by reference". Recovery mechanisms are provided, when appropriate, when unhandled exceptions occur during execution of the called routines.

According to one aspect of the invention, a recovery mechanism includes encapsulating the called routine and call statement block with a "catch-all" exception handler. Another aspect of the invention includes responding to an otherwise unhandled exception by restoring the actual parameter using a stored copy of the actual parameter. In one embodiment, the restoration is performed by making a handle (pointer) point to the copy of the actual parameter that was made before execution of the called routine.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
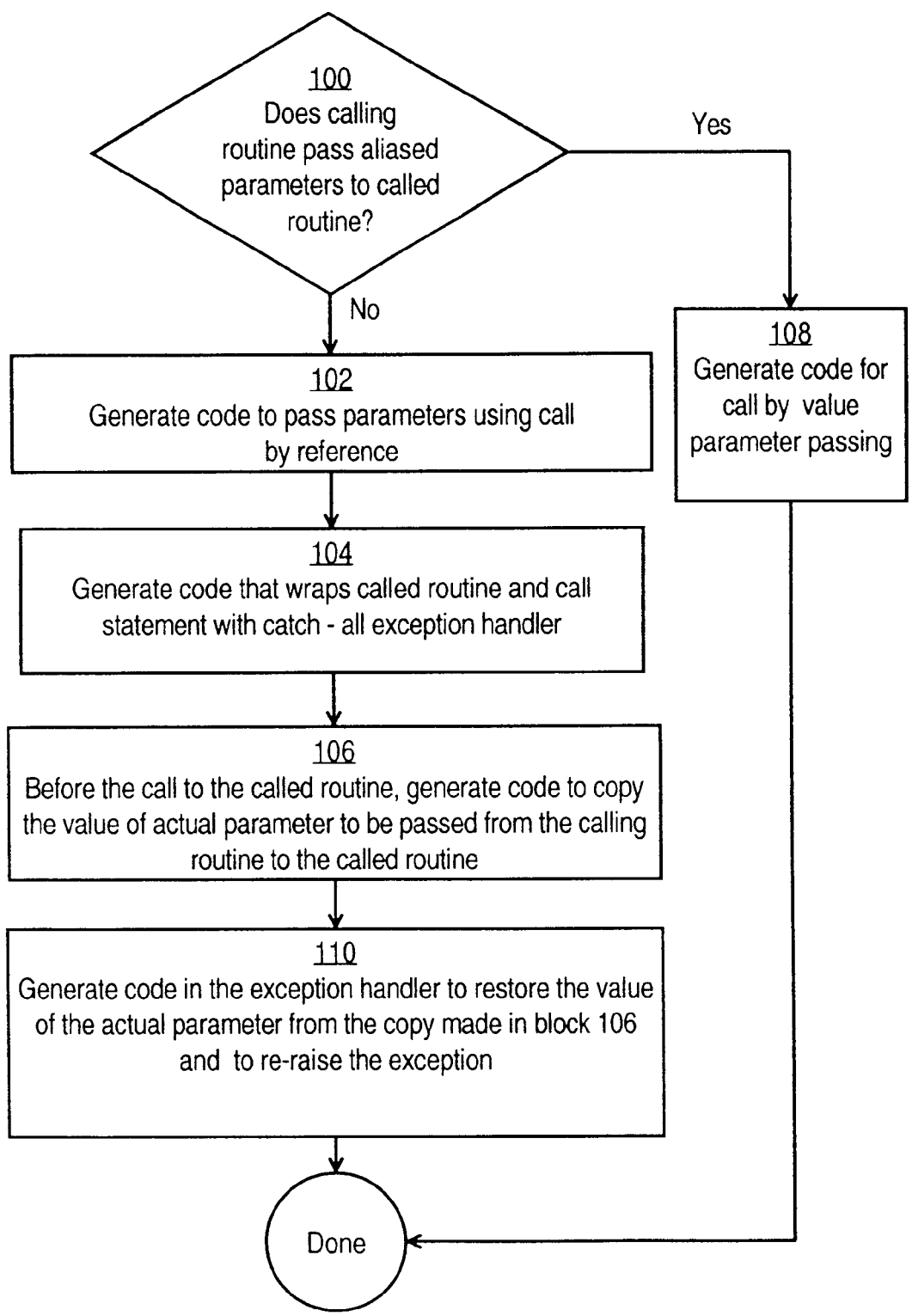
FIG. 1A is a flowchart that illustrates a method of parameter passing using copies of actual parameters.

A method and system are described for optimizing parameter passing. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

In one embodiment of the invention, "call by reference" is the preferred method for parameter passing as long as there are no aliased parameters in a call to a called routine. As explained earlier, "call by reference" parameter passing avoids the overhead of "call by value" parameter passing because there is no copy-in and copy-out of the actual parameter. However, the actual parameter may be corrupted if an unhandled exception occurs during execution of the called routine. To mitigate the problem of an unhandled exception, a mechanism is provided to ensure that the actual parameter is restored to its original value by making one copy of the actual parameter before execution of the called routine. Either the calling routine or the called routine makes the copy of the actual parameter before execution of the called routine. If an unhandled exception occurs in the called routine, the actual parameter is restored to its original value by replacing it with the copy that was made before execution of the called routine. If the called routine successfully executes, the copy is discarded. Thus, in the case where the routine executes successfully, the technique of making a copy of the actual parameter before execution of the called routine but still having the called routine operate on the actual parameter results in a 50% savings in overhead as compared to "call by value" parameter passing. Even when an unhandled exception occurs during execution of the called routine, the total overhead, including the overhead associated with restoring the actual parameter, is no more than the total overhead incurred in "call by value" parameter passing.

According to another aspect of the invention, the overhead associated with restoring the actual parameter in the event of an unhandled exception can be reduced. This is accomplished by not only making a copy of the actual parameter before execution of the called routine but also making a handle to the copy of the actual parameter. A handle is a pointer to a resource. Before execution of the called routine, a copy of the actual parameter is made and a temporary handle is created to point to the storage location that is storing the copy of the actual parameter. As before, a 50% savings in overhead is realized if the called routine executes successfully. However, unlike the previous case, if an unhandled exception occurs during execution of the called routine, the actual parameter is restored while incurring minimal overhead by simply replacing the handle of the actual parameter (used by the calling routine to access the actual parameter) with the handle that points to the copy of the actual parameter. This assumes that the calling routine accesses the actual parameter using a handle. This technique of copying a handle is especially useful when large data structures are involved. Restoring large data structures by copying an uncorrupted version over the corrupted one can significantly impact performance. Merely replacing a handle, on the other hand, incurs significantly less overhead.

According to yet another aspect of the invention, a 100% savings in overhead can be realized when certain conditions are satisfied, by using "call by reference" parameter passing and neither making a copy of the actual parameter nor making a handle for the copy of the actual parameter, as part of the recovery mechanism if an unhandled exception occurs in the called routine.

Specifically, if it is determined that neither the calling routine nor the called routine contain any exception handlers, then "call by reference" parameter passing is used without the expense of making any copy of the actual parameter or making a handle for the copy of the actual parameter. Often, routines do not contain any exception handling in order to allow the exception to propagate upward to a calling routine at a higher level in the call stack, and which has sufficient context information for deciding the appropriate recovery mechanism. Since the exception, if any, will be handled by a calling routine at a higher level in the call stack, there is no need to create another recovery mechanism at the lower level calling routine. For example, assume routine A calls routine B that calls routine C. If neither B nor C contain any exception handlers because A is better equipped to handle an exception, then, if certain conditions are satisfied, parameters are passed from B to C using "call by reference" parameter passing, and without the expense of making any copy of the actual parameter or making a handle for the copy of the actual parameter. The conditions that must be satisfied for "call by reference" parameter passing to be used under these circumstances are that the parameters passed from B to C are either local to B or, if they are not local to B, then they were passed from A to B using "call by value" parameter passing.

In another aspect of the invention, if it is determined that the called routine contains a "catch-all" exception handler, then "call by reference" parameter passing is used without the expense of making any copy of the actual parameter or making a handle for the copy of the actual parameter. A "catch-all" exception handler in the called routine will ensure that there are no unhandled exceptions during the execution of the called routine. For the purpose of simplification, it is assumed that there are no exceptions raised during execution of the exception handler itself. Thus, there will always be a recovery mechanism for preserving the integrity of any actual parameter that was passed to the called routine.

In yet another aspect of the invention, if it is determined that the set of exception handlers in the called routine is equal to or a superset of the set of exception handlers in the calling routine, then "call by reference" parameter passing is used without the expense of making any copy of the actual parameter. Here it is also assumed that there are no exceptions raised during execution of the exception handler. To illustrate, again assume that routine A calls routine B that calls routine C. Assume also that C's set of exception handlers is equal to or a superset of the set of exception handlers in B. B can pass any of its local variables to C using "call by reference" without the expense of making any copy of the value the parameters because B's local variables are not visible to A and therefore do not affect A. If an unhandled exception occurs during the execution of C, then the earliest that the exception can be handled is at A because B's set of exception handlers is a subset of C's set of exception handlers. Thus, A can deploy the appropriate recovery mechanism and is unaffected by B's now corrupted local variables. For this same reason, B can also pass to C, using "call by reference" without the expense of making any copies, all variables that are not local to B but that were passed to B from A using "call by value" parameter passing. When the unhandled exception occurring in C propagates up to A, the parameters that A passed to B will be intact because they were passed to B using "call by value" parameter passing.

CALL BY REFERENCE WITH SAFETY MECHANISM

FIG. 1A is a flowchart illustrating a method to pass parameters for a particular call made from a calling routine to a called routine so as to achieve 50% savings in overhead when no unhandled exceptions occur as compared to conventional "call by value" parameter passing techniques. The method in FIG. 1A is to be viewed in the context of a compiler generating executable code to implement an embodiment of the invention. However, the techniques described herein are not limited to the context of a compiler. For example, an embodiment of the invention is described in the context of a pre-compiler as well, as detailed below under the subheading, "Pre-compiler Implementation".

Returning to the context of a compiler, assume that the compiler would generate executable code in the manner that it normally would when compiling a computer program. However, in order to implement an embodiment of the invention, the compiler would have to perform some additional steps. FIG. 1A describes such additional steps and in no way suggests that these are the only steps performed by the compiler. In FIG. 1A, at block 100, a compiler determines, for the particular call, if the calling routine is passing one or more aliased parameters. Recall that if the calling routine passes the same parameter more than once in the same call to the called routine, it is said to be passing aliased parameters. Another example of aliased parameters is when two different parameters are passed to a called routine but the parameters point to the same memory location. Also, a parameter that is passed to a called routine is said to be aliased if it points to the same memory location as another variable that is visible to the called routine (e.g. a global variable). If aliased parameters are passed in a call to a called routine, then at block 108, the compiler generates code for "call by value". When a parameter is aliased, "call by value" passing is necessary to preserve the correct alias semantics inherent in "call by value" parameter passing, and no savings in overhead can be realized for that parameter.

If the call does not include aliased parameters, then at block 102, for that particular call, the compiler generates executable code to pass the parameters from the calling routine to the called routine using "call by reference" parameter passing. At block 104, the compiler generates executable code that performs "catch-all" exception handling to catch any unhandled exception occurring in the called routine. This is achieved by generating executable code that has the effect of wrapping the call statement to the called routine with a "catch-all" exception handler. At block 106, the compiler generates executable code that makes a copy of each actual parameter being passed to the called routine using "call by reference". The generated executable code causes these copies to be made before execution of the called routine. At block 110, the compiler generates code in the "catch-all" exception handler to restore the values of the actual parameters from the aforementioned copies and to re-raise the exception.

Figure 1B:
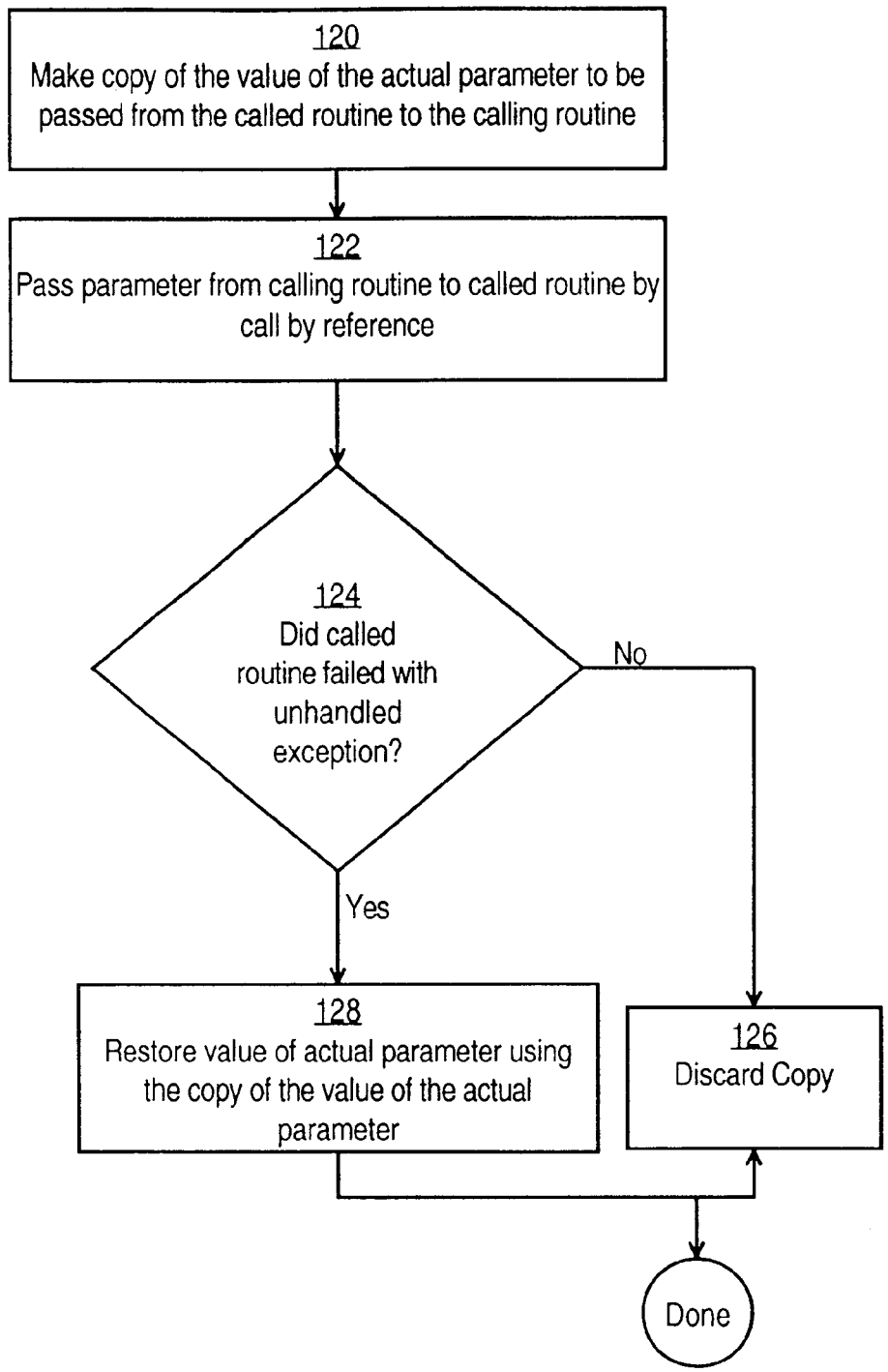
FIG. 1B is a flowchart that illustrates a method of parameter passing during run-time.

FIG. 1B is a flowchart illustrating what happens during run-time execution of the code generated by the process of FIG. 1A. At block 120 of FIG. 1B, a copy is made of each actual parameter to be passed to the called routine using "call by reference". At block 122, the parameters are passed from the calling routine to the called routine using "call by reference. At block 124, it is determined if the called routine failed with an unhandled exception during execution. If the called routine executes successfully, then at block 126 the copies of the actual parameters are discarded. Otherwise, at block 128, the actual parameters are restored to their original value before execution of the called routine by overwriting the corrupted parameters with the copies, made before execution of the called routine, of the actual parameters.

PRE-COMPILER IMPLEMENTATION

For purposes of explanation, an embodiment of the invention has been described in the context of a compiler generating executable code that implements a particular call. However, the techniques described herein are not limited to that context. For example, a pre-compiler may be used to generate source code to wrap the called routine and the call statement to the called routine with a "catch-all" exception handler, as well as generating code to make of a copy of each actual parameter being passed using "call by reference". A pre-compiler is a computer program that automatically adds, deletes or otherwise alters the lines of source code of a given computer program. Whereas a compiler converts source code into executable code, a pre-compiler converts source code into modified source code. In the case of using a pre-compiler, the pre-compiler would use the appropriate "call by reference" syntax for parameters that are to be passed by "call by reference" to a called routine. The pre-compiler would also add the appropriate lines of source code to (1) to make copies of actual parameters to be passed to the called routine before execution of the called routine, and (2) create a "catch-all" exception handler for the called routine that restores the actual parameters in the event of an unhandled exception.

A pre-compiler implementation of the method in FIG. 1A can be illustrated by the following pseudocode. Within the pseudocode are interspersed explanatory comments denoted by the prefix, " - - - ":

For the purpose of explanation, assume that the calling routine contains the following source code:

```
main ( )
   parm1 number;
   parm2 char( . . . );
begin
   proc (parm1, parm2); - - - call statement
end;
```

Further, assume that the called routine is as follows:

```
proc (n number, v char) is
begin
   . . .
end;
```

The calling routine code includes a call to the routine "proc" that passes two parameters. The actual parameters passed in this call are "parm1" and "parm2". The calling routine also includes code that declares the type of these actual parameters.

At step 100, the pre-compiler encounters the call statement "proc (parm1, parm2)" and determines whether the call is passing any aliased parameters. In the present example, the two parameters passed to "proc" are not aliased, so control passes to step 102. At step 102, the pre-compiler modifies the source code as needed to specify that "call by reference" parameter passing should be used to pass parm1 and parm2 to proc. The actual modification performed at this point will vary from implementation to implementation based on the syntax of the source code language. For example, call by reference parameter passing may involve adding an "&" before the actual parameters in the call statement, resulting in the modified call statement of "proc (&parm1, &parm2)".

At step 106, the pre-compiler generates source code that declares temporary variables that correspond to the actual parameters, and causes the value of each actual parameter to be stored in its corresponding temporary variable. This code is placed before the call statement in the called routine. After this code is generated, the source code for the calling routine may appear as follows:

```
main ( )
   temp1 number;
   temp2 char( . . . );
   parm1 number;
   parm2 char( . . . );
begin
   temp1:=parm1 - - - make copy of actual parameter
   temp2:=parm2 - - - make copy of actual parameter
   proc (&parm1, &parm2);—both parm1 and parm2 are
      passed
      - - - using call by reference
end;
```

Next, the pre-compiler generates code that will discard the copy of each actual parameter if the called routine executes successfully. The pre-compiler also generates code that has the effect of wrapping the call statement with a "catch-all" exception handler. After these steps are performed, the pseudo code of the calling routine may contain additional lines of code as follows.

```
main ( )
...
begin
   temp1:=parm1 - - - make copy of actual parameter
   temp2:=parm2 - - - make copy of actual parameter
   proc (&parm1, &parm2); - - - both parm1 and parm2
      are passed
      - - - using call by reference
   - - - proc has completed successfully. Deallocate
      memory for temp1 & temp2
   free memory for temp1 & temp2;
exception
   when others then - - - when others represents a "catch-
      all" exception
      parm1:=temp1;
      parm2:temp2;
      raise; - - - re-raise the exception
end;
```

During run-time, temp1 and temp2, the temporary copies of the actual parameters, parm1 and parm2, are created. The copies are made before the execution of the routine proc. If proc executes successfully, then temp1 and temp2 are discarded. However, if proc fails with an unhandled exception, then the "catch all" exception handler, "when others", wrapped around the call block restores the actual parameters, parm1 and parm2, to their original value by overwriting the values of parm1 and parm2 with the values stored in temp1 and temp2 respectively.

AVOIDING COPY-OUT OVERHEAD ON UNHANDLED EXCEPTIONS

Using the technique described above, the copy-out overhead associated with call-by-value parameter passing is avoided when execution of the called routine does not result in an unhandled exception. However, the copy-out overhead is still incurred when execution of the called routine does result in an unhandled exception. In the example given above, that overhead is embodied in the statements:

parm1:=temp1;
parm2:=temp2;

which are executed upon encountering an otherwise unhandled exception. According to one embodiment, a mechanism is provided for reducing the copy-out overhead, even in the case of an unhandled exception, when the calling routine uses a handle to access the actual parameters.

Figure 2:
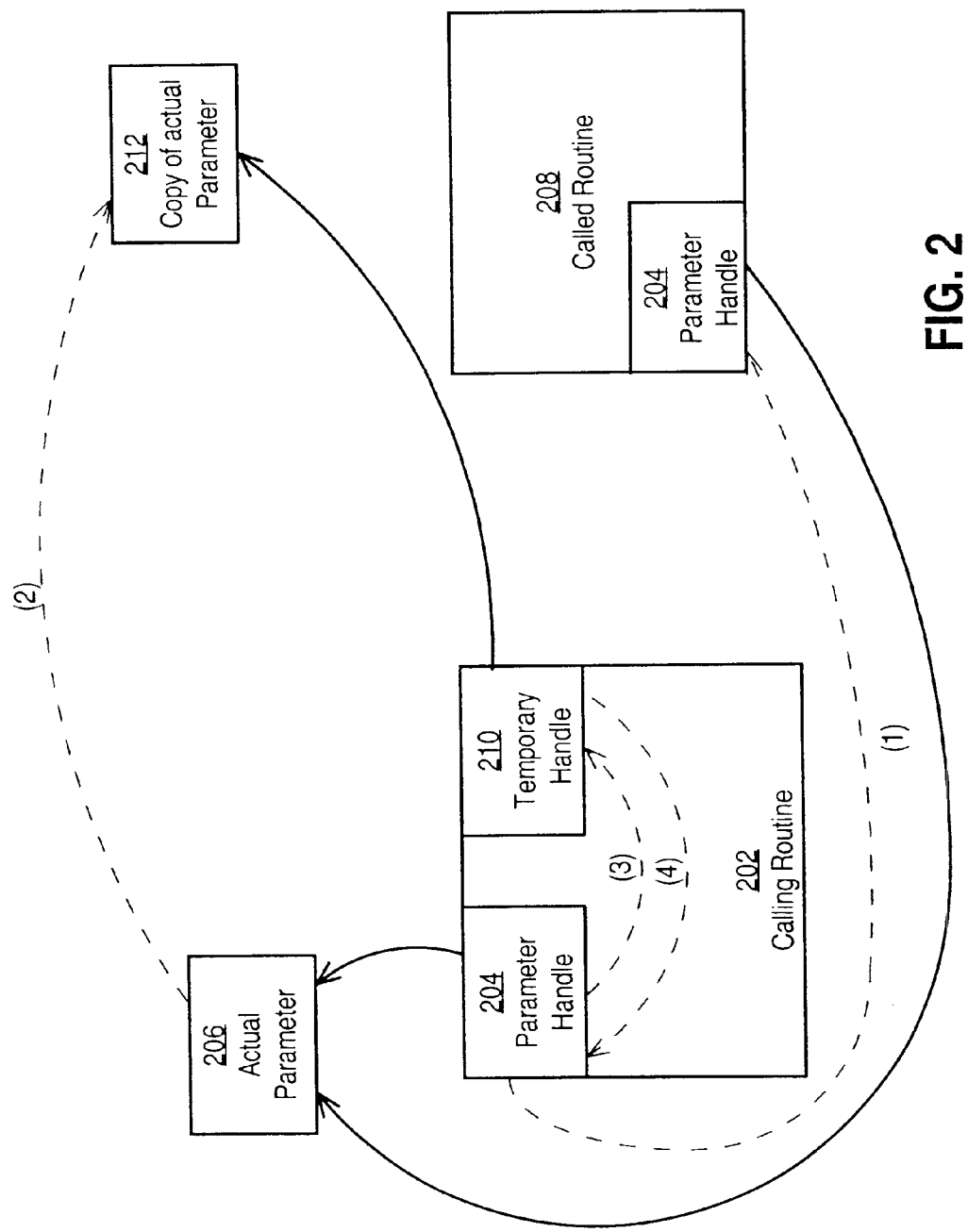
FIG. 2 is a block diagram that illustrates a method of parameter passing using handles.

FIG. 2 is a block diagram illustrating the use of temporary handles to preserve the 50% savings in overhead when an unhandled exception occurs. In FIG. 2, assume that routine 202 is the calling routine and routine 208 is the called routine. The calling routine 202 maintains a parameter handle 204 that points to the actual parameter 206. All access to actual parameter 206 by the calling routine 202 is made through handle 204. The dotted arrows in FIG. 2, numbered 1 to 4, represent a sequence of actions as explained below. The solid arrows are pointers.

In the call to called routine 208, an actual parameter is passed by reference by passing the value of parameter handle 204 (indicated by dotted arrow (1)) to the called routine 208. Before execution of called routine 208, a copy 212 of the actual parameter 206 is made (indicated by dotted arrow (2)). Next, a temporary handle 210 is created to point to the copy 212 of actual parameter 206 (indicated by dotted arrow (3)).

If the routine 208 fails with an unhandled exception, simply overwriting parameter handle 204 with the temporary handle 210 (indicated by dotted arrow (4)) restores the actual parameter 206. The actual parameter 206 is restored while incurring minimal overhead by simply replacing its handle with the temporary handle 210 that points to the copy, made before execution of the called routine 208, of the actual parameter 206. Restoring large data structures by copying an uncorrupted version of the data structure over the corrupted one can significantly impact performance. Merely replacing a handle, on the other hand, incurs significantly less overhead. By overwriting parameter handle 204 with the temporary handle 210, the actual parameter's handle will then point to the uncorrupted copy 212 of the actual parameter.

The following pseudocode serves to further illustrate the use of temporary handles to preserve the 50% savings in overhead when an unhandled exception occurs. Within the pseudocode are interspersed explanatory comments denoted by the prefix, " - - - ".

Assume that the compiler has determined that the calling routine is not passing aliased parameters to the called routine, and the compiler has generated code to use "call by reference" parameter passing for parameters n and v. Further, assume that the called routine is as follows:

```
proc (n number, v char) is
begin
   . . .
end;
```

Next, assume that the calling routine is as follows.

```
main ( )
   temp1 number;
   temp2 char( . . . );
   parm1 number;
   parm2 char( . . . );
begin
   proc (parm1, parm2); - - - call statement
end,
```

The compiler generates executable code that causes a copy of each actual parameter before the executing the call statement, which is a call to the called routine. The compiler also generates executable code that causes a temporary handle to be made for each copy of each actual parameter to be passed using "call by reference" to the called routine. Next, the compiler generates executable code that will discard the copy of each actual parameter as well as their respective temporary handles if the called routine executes successfully. The compiler then generates executable code that has the effect of wrapping the call statement with a "catch-all" exception handler. If a pre-compiler is used, the pseudo code of the calling routine may contain additional lines of code as follows.

```
main ( )
   . . .
begin
   temp1:=parm1 - - - make copy of actual parameter
   temp2:=parm2 - - - make copy of actual parameter
   proc (parm1, parm2); - - - call statement; both parm1
      and parm2 are passed
      - - - using call by reference
   - - - proc has completed successfully. Deallocate
      memory for temp1 & temp2
   free memory for temp1 & temp2;
exception
   when others then - - - when others represents a "catch-
      all" exception
      free memory for parm1 & parm2;
      overwrite the handles of parm1 & parm2 with the
         handles of temp1 & temp2 respectively;
      - - - re-raise the exception;
      raise;
end;
```

During run-time, temp1 and temp2, the temporary copies of the actual parameters, parm1 and parm2, are created. The copies are made before the execution of the routine proc. If proc executes successfully, then temp1 and temp2 are discarded. However, if proc fails with an unhandled exception, then the "catch all" exception handler wrapped around the call block overwrites the handles of parm1 and parm2 with the values of the handles for temp1 and temp2 respectively.

CALL BY REFERENCE WITH NO NEED FOR SAFETY MECHANISM

In the techniques described above, temporary variables were used to store parameter values so that the parameter values could be restored in the case of an unhandled exception. This use of temporary variables serves as a safety mechanism to ensure that call-by-value semantics are achieved. However, this safety mechanism incurs the copy-in overhead of copying the actual parameter values into the temporary variables prior to executing the call. According to one aspect of the invention, techniques are employed to detect conditions in which the safety mechanism is not needed. If it is detected that the safety mechanism is not needed for the call, the safety mechanism code is not generated for making the call. Thus, executing the call does not generate the overhead associated with the safety mechanism.

Figure 3B:
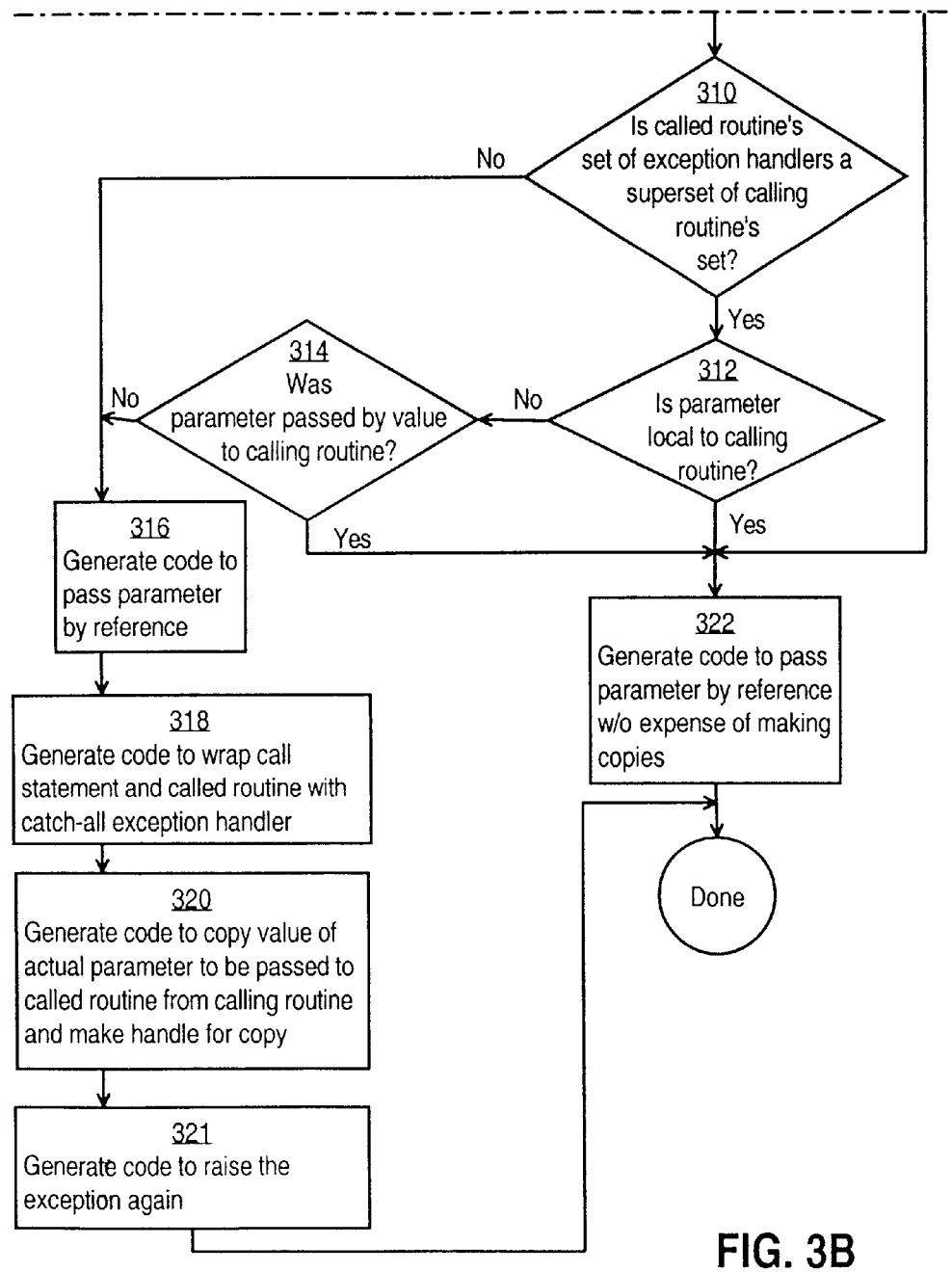
FIG. 3 is a flowchart that illustrates a method of parameter passing without using copies of actual parameters.

FIG. 3 is a flowchart that illustrates steps of generating code for a call, where "call by reference" is used to pass a parameter to the called routine without the expense of making a copy of the actual parameter, or restoring the actual parameter in the case of an unhandled exception.

At block 300 of FIG. 3, the compiler first determines if there are any parameters that are aliased in the call to the called routine. If aliased parameters are passed in the call, then at block 304, the compiler generates code for "call by value" parameter passing. The "call by value" code preserves the correct alias semantics inherent in "call by value" parameter passing, but no savings in overhead can be realized.

If the call does not include an aliased variable, then at block 302, the compiler determines what set of exception handlers the calling routine and called routine possess. At block 306, it is determined whether either the calling routine or the called routine possess any exception handlers. If neither the calling routine nor the called routine possess any exception handlers, then control passes to block 322.

At block 322, the compiler generates executable code to pass parameters using "call by reference" parameter passing without generating executable code to (1) make a copy of the actual parameter before execution of the called routine, and (2) make a handle for the copy of the actual parameter. By neither making a copy, during run-time, of the actual parameter, nor making a handle for said copy, 100% savings in overhead is realized over that of "call by value" parameter passing. In such a case, any exception propagates upward to a calling routine at a higher level in the call stack, and which has sufficient context information for deciding the appropriate recovery mechanism.

If at block 306, it is determined that either the calling routine or the called routine contain exception handlers, then control passes to block 308. At block 308, it is determined if the called routine contains a "catch-all" exception handler. If the called routine contains a "catch-all" exception handler, then control passes to block 322 (see above). Otherwise, at block 310, it is determined if the called routine's set of exception handlers is a superset of the calling routine's set of exception handlers. If it is determined that the called routine's set of exception handlers is not a superset of the calling routine's set of exception handlers, then control passes to block 316.

At block 316, the compiler generates executable code to pass the parameters from the particular calling routine to the called routine using "call by reference" parameter passing. At block 318, the compiler generates executable code that performs "catch-all" exception handling to catch any unhandled exception when control is returned to the calling routine. This is achieved by generating executable code that has the effect of wrapping the call statement to the called routine with a "catch-all" exception handler.

At block 320, the compiler generates executable code that makes a copy of each actual parameters being passed to the called routine using "call by reference". The generated executable code causes these copies to be made before execution of the called routine. If the actual parameter maintains a handle, the compiler also generates code to make a handle for copies of the actual parameters if the actual parameters are large data structures. For purposes of explanation, causing the wrapping of the called routine and the call statement to the called routine with a "catch-all" exception handler, as well as causing the making of a copy of each actual parameter being passed using "call by reference" can be alternatively performed by a pre-compiler. In this case, the pre-compiler would use the appropriate "call by reference" syntax for parameters that are to be passed by "call by reference" to a called routine. The pre-compiler would also add the appropriate lines of source code to the calling routine that is passing parameters to the called routine using "call by reference", such that the resulting executable code will make copies of actual parameters to be passed to the called routine before execution of the called routine, as well as cause the wrapping of the called routine and the call statement to the called routine with a "catch-all" exception handler. Control then passes to block 321 where either compiler or the pre-compiler generates code to raise again the exception.

If at block 310, it is determined that the called subroutine's set of exception handlers is a superset of the calling routine's set of exception handlers, then control passes to block 312. At block 312, it is further determined if the actual parameter being passed to the called routine is local to the calling routine. If the actual parameter being passed to the called routine from the calling routine is local to the calling routine, then at block 322, the compiler or pre-compiler generates code to cause "call by reference" parameter passing without the expense of either making copies of actual parameters or making handles to point to the copies.

Otherwise, if the actual parameter being passed to the called routine is not local to the calling routine, then at block 314, it is determined if the actual parameter being passed from the calling routine to the called routine was initially passed using "call by value" to the calling routine from another routine that is higher up in the call stack. If it is determined that the actual parameter being passed from the calling routine to the called routine was initially passed using "call by value" to the calling routine from another routine that is higher up in the call stack, then control passes to block 322 explained above. Otherwise, control passes to block 316 explained above.

HARDWARE OVERVIEW

Figure 4:
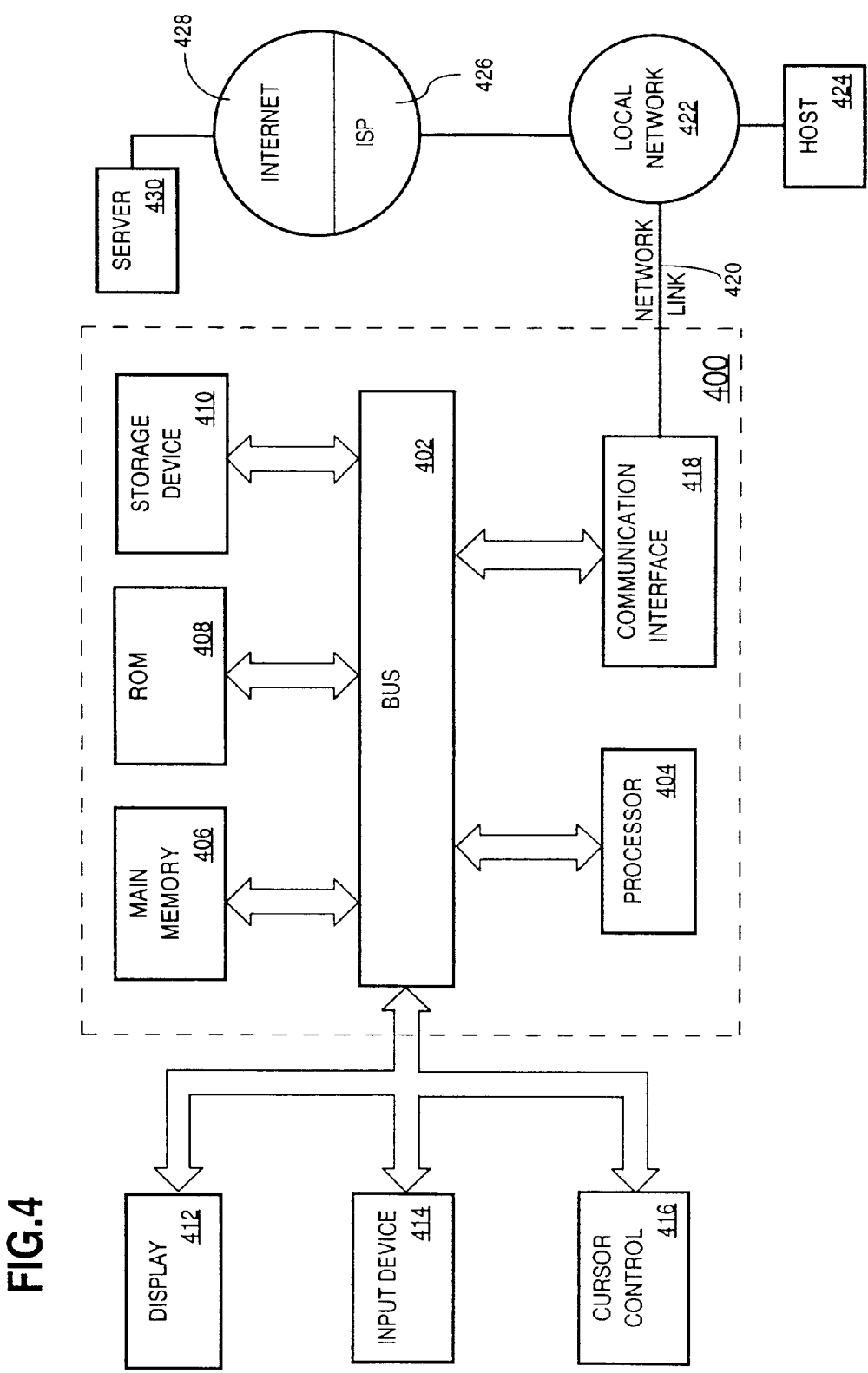
FIG. 4 illustrates a computer system on which embodiments of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for parameter passing. According to one embodiment of the invention, parameter passing is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for parameter passing as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing a call that includes passing a parameter from a calling routine to a called routine, the method comprising the steps of:

determining whether the parameter is aliased;

if the parameter is not aliased, then
generating code to pass the parameter using call by reference;

if the parameter is aliased, then generating code to pass the parameter in the call using call by value.

2. The method of claim 1 further comprising the step of generating code to encapsulate the call with a catch-all exception handler.

3. The method of claim 1 further comprising the steps of:

generating code to store a copy of a value held by the parameter, said value being the value of the parameter at the time the call is made; and generating code to replace the parameter with the copy of the value of the parameter if the called routine fails with an unhandled exception.

4. The method of claim 1 further comprising the steps of:

generating code to store a copy of a value held by the parameter, said value being the value of the parameter at the time the call is made;

generating code to make a handle for the copy of the value of the parameter in the call if the parameter maintains a handle; and generating code to replace the handle of the parameter with the handle for copy of the value of the parameter if the called routine fails with an unhandled exception.

5. The method of claim 1 further comprising the step of determining a set of exception handlers in the calling routine and the called routine.

6. The method of claim 5 further comprising the steps of:

generating code to pass the parameter in the call by using call by reference if neither the called routine nor the calling routine contain any exception handlers; and generating code to pass the parameter in the call by using call by reference if the called routine contains a catch-all exception handler.

7. The method of claim 5 further comprising the steps of:

determining if the called routine's set of exception handlers is a superset of the called routine's set of exception handlers; and if the called routine's set of exception handlers is not the superset of the called routine's set of exception handlers, then generating code to pass the parameter in the call by using call by reference;

generating code to cause a copy of the value of the parameter in the call to be made before the called routine is executed;

generating code to make a handle for the copy of the value of the parameter in the call if the parameter maintains a handle; and generating code to replace the handle of the parameter with the handle for copy of the value of the parameter if the called routine fails with an unhandled exception.

8. The method of claim 5 further comprising the steps of:

determining if the called routine's set of exception handlers is a superset of the called routine's set of exception handlers; and if the called routine's set of exception handlers is a superset of the called routine's set of exception handlers, then determining if the parameter in the call is local to the calling routine;

if the parameter in the call is local to the calling routine, then generating code to pass parameters to the called routine using call by reference;

if the parameter in the call is not local to the calling routine, then determining if the parameter in the call was passed by value to the calling routine;

if the parameter in the call was passed by value to the calling routine, then generating code to pass parameters to the called routine using call by reference; and if the parameter in the call was passed not by value to the calling routine, then generating code to pass parameters to the called routine using call by reference;

generating code to cause a copy of the value of the parameter in the call to be made before the called routine is executed;

if the parameter maintains a handle, then generating code to make a handle for the copy of the value of the parameter in the call;

generating code to replace the handle of the parameter with the handle for copy of the value of the parameter if the called routine fails with an unhandled exception;

if the parameter does not maintain a handle, then generating code to replace the parameter with the copy of the value of the parameter if the called routine fails with the unhandled exception.

9. A method for executing a call that includes passing a parameter from a calling routine to a called routine, the method comprising the steps of:

receiving the call from the calling routine in which a parameter is passed to the called routine;

making a copy of a value of the parameter;

passing the parameter from the calling routine to the called routine using call by reference;

detecting if there is an unhandled exception during execution of the called routine;

if an unhandled exception occurs during execution of the called routine, then restoring the parameter; and if an unhandled exception does not occur during execution of the called routine, then exiting the called routine without restoring the parameter.

10. The method of claim 9 wherein the step of restoring the parameter further comprising the steps of:

storing, before the parameter is updated by the called routine, the copy of the value of the parameter by executing code that was previously generated by a compiler or pre-compiler in response to detecting that the call did not involve passing aliased parameters to the called routine; and overwriting the parameter with the value of the copy of the parameter.

11. The method of claim 9 wherein the step of restoring the parameter further comprises the steps of:

storing, before the parameter is updated by the called routine, the copy of the value of the parameter in the call by executing code that was previously generated by a compiler or pre-compiler in response to detecting that the call did not involve aliased parameters to the called routine;

if the calling routine accesses the parameter through a handle, then generating a handle pointing to the copy of the value of the parameter;

restoring the parameter by overwriting the handle of the parameter in the call with the handle pointing to the copy of the value of the parameter.

12. A computer-readable medium carrying one or more sequences of instructions for executing a call that includes passing a parameter from a calling routine to a called routine, wherein execution of the one or more sequences of instructions by one or more processors causes the one or more processors to perform the steps of:

determining whether the parameter is aliased;

if the parameter is not aliased, then generating code to pass the parameter using call by reference;

if the parameter is alaised, then generating code to pass the parameter in the call using call by value.

13. The computer-readable medium of claim 12 further comprising the step of generating code to encapsulate the call with a catch-all exception handler.

14. The computer-readable medium of claim 12 further comprising the steps of:

generating code to store a copy of a value held by the parameter, said value being the value of the parameter at the time the call is made; and generating code to replace the parameter with the copy of the value of the parameter if the called routine fails with an unhandled exception.

15. The computer-readable medium of claim 12 further comprising the steps of:

generating code to store a copy of a value held by the parameter, said value being the value of the parameter at the time the call is made;

generating code to make a handle for the copy of the value of the parameter in the call if the parameter maintains a handle; and generating code to replace the handle of the parameter with the handle for copy of the value of the parameter if the called routine fails with an unhandled exception.

16. The computer-readable medium of claim 12 further comprising the step of determining a set of exception handlers in the calling routine and the called routine.

17. The computer-readable medium of claim 16 further comprising the steps of:
generating code to pass the parameter in the call by using call by reference if neither the called routine nor the calling routine contain any exception handlers; and
generating code to pass the parameter in the call by using call by reference if the called routine contains a catch-all exception handler.

18. The computer-readable medium of claim 16 further comprising the steps of:
determining if the called routine's set of exception handlers is a superset of the called routine's set of exception handlers; and
if the called routine's set of exception handlers is not the superset of the called routine's set of exception handlers, then
generating code to pass the parameter in the call by using call by reference;
generating code to cause a copy of the value of the parameter in the call to be made before the called routine is executed;
generating code to make a handle for the copy of the value of the parameter in the call if the parameter maintains a handle; and
generating code to replace the handle of the parameter with the handle for copy of the value of the parameter if the called routine fails with an unhandled exception.

19. The computer-readable medium of claim 16 further comprising the steps of:
determining if the called routine's set of exception handlers is a superset of the called routine's set of exception handlers; and
if the called routine's set of exception handlers is a superset of the called routine's set of exception handlers, then
determining if the parameter in the call is local to the calling routine;
if the parameter in the call is local to the calling routine, then generating code to pass parameters to the called routine using call by reference;
if the parameter in the call is not local to the calling routine, then determining if the parameter in the call was passed by value to the calling routine;
if the parameter in the call was passed by value to the calling routine, then
generating code to pass parameters to the called routine using call by reference; and
if the parameter in the call was passed not by value to the calling routine, then
generating code to pass parameters to the called routine using call by reference;
generating code to cause a copy of the value of the parameter in the call to be made before the called routine is executed;
if the parameter maintains a handle, then
generating code to make a handle for the copy of the value of the parameter in the call;
generating code to replace the handle of the parameter with the handle for copy of the value of the parameter if the called routine fails with an unhandled exception;
if the parameter does not maintain a handle, then
generating code to replace the parameter with the copy of the value of the parameter if the called routine fails with the unhandled exception.

20. A computer-readable medium carrying one or more sequences of instructions for executing a call that includes passing a parameter from a calling routine to a called routine, wherein execution of the one or more sequences of instructions by one or more processors causes the one or more processors to performs the steps of:
making a copy of a value of the parameter;
passing the parameter from the calling routine to the called routine using call by reference;
detecting if there is an unhandled exception during execution of the called routine;
if an unhandled exception occurs during execution of the called routine, then restoring the parameter; and
if an unhandled exception does not occur during execution of the called routine, then
exiting the called routine without restoring the parameter.

21. The computer-readable medium of claim 20 wherein the step of restoring the parameter further comprising the steps of:
storing, before the parameter is updated by the called routine, the copy of the value of the parameter by executing code that was previously generated by a compiler or pre-compiler in response to detecting that the call did not involve passing aliased parameters to the called routine; and
overwriting the parameter with the value of the copy of the parameter.

22. The computer-readable medium of claim 20 wherein the step of restoring the parameter further comprises the steps of:
storing, before the parameter is updated by the called routine, the copy of the value of the parameter in the call by executing code that was previously generated by a compiler or pre-compiler in response to detecting that the call did not involve passing aliased parameters to the called routine;
if the calling routine accesses the parameter through a handle, then generating a handle pointing to the copy of the value of the parameter;
restoring the parameter by overwriting the handle of the parameter in the call with the handle pointing to the copy of the value of the parameter.

23. A computer system for executing a call that includes passing a parameter from a calling routine to a called routine, the computer system comprising a memory containing one or more sequences of instructions which, when executed by one or more processors, cause the one or more processors to perform the steps of:
determining whether the parameter is aliased;
if the parameter is not aliased, then
generating code to pass the parameter using call by reference; and
if the parameter is alaised, then generating code to pass the parameter in the call using call by value.

24. The computer system of claim 23, wherein the memory further comprises one or more additional instructions which, when executed by the one or more processors, cause the one or more processors to perform the step of generating code to encapsulate the call with a catch-all exception handler.

25. The computer system of claim 23, wherein the memory further comprises one or more additional instructions which, when executed by the one or more processors, cause the one or more processors to perform the steps of:

generating code to store a copy of a value held by the parameter, said value being the value of the parameter at the time the call is made; and generating code to replace the parameter with the copy of the value of the parameter if the called routine fails with an unhandled exception.

26. The computer system of claim 23 wherein, the memory further comprises one or more additional instructions which, when executed by the one or more processors, cause the one or more processors to perform the steps of:

generating code to store a copy of a value held by the parameter, said value being the value of the parameter at the time the call is made;

generating code to make a handle for the copy of the value of the parameter in the call if the parameter maintains a handle; and generating code to replace the handle of the parameter with the handle for copy of the value of the parameter if the called routine fails with an unhandled exception.

27. The computer system of claim 23, wherein the memory further comprises one or more additional instructions which, when executed by the one or more processors, cause the one or more processors to perform the step of determining a set of exception handlers in the calling routine and the called routine.

28. The computer system of claim 27, wherein the memory further comprises one or more additional instructions which, when executed by the one or more processors, cause the one or more processors to perform the steps of:

generating code to pass the parameter in the call by using call by reference if neither the called routine nor the calling routine contain any exception handlers; and generating code to pass the parameter in the call by using call by reference if the called routine contains a catch-all exception handler.

29. The computer system of claim 27, wherein the memory further comprises one or more additional instructions which, when executed by the one or more processors, cause the one or more processors to perform the steps of:

determining if the called routine's set of exception handlers is a superset of the called routine's set of exception handlers; and if the called routine's set of exception handlers is not the superset of the called routine's set of exception handlers, then
generating code to pass the parameter in the call by using call by reference;
generating code to cause a copy of the value of the parameter in the call to be made before the called routine is executed;
generating code to make a handle for the copy of the value of the parameter in the call if the parameter maintains a handle; and
generating code to replace the handle of the parameter with the handle for copy of the value of the parameter if the called routine fails with an unhandled exception.

30. The computer system of claim 27, wherein the memory further comprises one or more additional instructions which, when executed by the one or more processors, cause the one or more processors to perform the steps of:

determining if the called routine's set of exception handlers is a superset of the called routine's set of exception handlers; and if the called routine's set of exception handlers is a superset of the called routine's set of exception handlers, then
determining if the parameter in the call is local to the calling routine;
if the parameter in the call is local to the calling routine, then generating code to pass parameters to the called routine using call by reference;
if the parameter in the call is not local to the calling routine, then determining if the parameter in the call was passed by value to the calling routine;
if the parameter in the call was passed by value to the calling routine, then
generating code to pass parameters to the called routine using call by reference; and
if the parameter in the call was passed not by value to the calling routine, then
generating code to pass parameters to the called routine using call by reference;
generating code to cause a copy of the value of the parameter in the call to be made before the called routine is executed;
if the parameter maintains a handle, then
generating code to make a handle for the copy of the value of the parameter in the call;
generating code to replace the handle of the parameter with the handle for copy of the value of the parameter if the called routine fails with an unhandled exception;
if the parameter does not maintain a handle, then
generating code to replace the parameter with the copy of the value of the parameter if the called routine fails with the unhandled exception.

31. A computer system for executing a call that includes passing a parameter from a calling routine to a called routine, the computer system comprising a memory containing one or more sequences of instructions which, when executed by one or more processors, cause the one or more processors to perform the steps of:

receiving the call from the calling routine in which a parameter is passed to the called routine;

making a copy of a value of the parameter;

passing the parameter from the calling routine to the called routine using call by reference;

detecting if there is an unhandled exception during execution of the called routine;

if an unhandled exception occurs during execution of the called routine, then
restoring the parameter; and if an unhandled exception does not occur during execution of the called routine, then
exiting the called routine without restoring the parameter.

32. The computer system of claim 31 wherein the step of restoring the parameter further comprises the steps of:

storing, before the parameter is updated by the called routine, the copy of the value of the parameter by executing code that was previously generated by a compiler or pre-compiler in response to detecting that the call did not involve passing aliased parameters to the called routine; and overwriting the parameter with the value of the copy of the parameter.

33. The computer system of claim 31 wherein the step of restoring the parameter further comprises the steps of:

storing, before the parameter is updated by the called routine, the copy of the value of the parameter in the call by executing code that was previously generated by a compiler or pre-compiler in response to detecting that the call did not involve passing aliased parameters to the called routine;

if the calling routine accesses the parameter through a handle, then generating a handle pointing to the copy of the value of the parameter;

restoring the parameter by overwriting the handle of the parameter in the call with the handle pointing to the copy of the value of the parameter.

\* \* \* \* \*

UNITED STATES PATENT AND TRADEMARK OFFICE
CERTIFICATE OF CORRECTION

PATENT NO.     : 6,481,007 B1
DATED          : November 12, 2002
INVENTOR(S)    : Iyer et al.

It is certified that error appears in the above-identified patent and that said Letters Patent is hereby corrected as shown below:

Column 18,
Line 7, replace "making a copy of a value of the parameter" with -- receiving the call from the calling routine in which a parameter is passed to the called routine; making a copy of a value of the parameter --.

Signed and Sealed this

Twenty-fourth Day of June, 2003

JAMES E. ROGAN
*Director of the United States Patent and Trademark Office*